(12) United States Patent
Shelley et al.

(10) Patent No.: US 12,264,067 B2
(45) Date of Patent: Apr. 1, 2025

(54) GASIFICATION OF HIGH-ASH FEEDSTOCK

(71) Applicant: Air Products and Chemicals, Inc., Allentown, PA (US)

(72) Inventors: Jacob Shelley, Amsterdam (NL); Joachim Wolff, Lutherstadt Wittenberg (DE); Thomas Von Kossak, Reichshof (DE); Eduardo Ribeiro, Leiden (NL); Nan Liu, The Hague (NL); Steffen Jancker, Steinhagen (DE)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 0 days.

(21) Appl. No.: 17/530,515

(22) Filed: Nov. 19, 2021

(65) Prior Publication Data

US 2023/0159328 A1 May 25, 2023

(51) Int. Cl.
| | |
|---|---|
| *C10J 3/84* | (2006.01) |
| *C01B 3/36* | (2006.01) |
| *C01B 3/52* | (2006.01) |
| *C10J 3/72* | (2006.01) |

(52) U.S. Cl.
CPC ............... *C01B 3/363* (2013.01); *C01B 3/52* (2013.01); *C10J 3/84* (2013.01); *C01B 2203/049* (2013.01); *C01B 2203/0877* (2013.01); *C01B 2203/1235* (2013.01); *C01B 2203/148* (2013.01); *C10J 3/723* (2013.01); *C10J 2300/0973* (2013.01); *C10J 2300/169* (2013.01)

(58) Field of Classification Search
CPC ............... C10J 3/84; C10J 3/485; C10K 1/06
See application file for complete search history.

(56) References Cited

U.S. PATENT DOCUMENTS

| | | | |
|---|---|---|---|
| 9,045,814 B2 | 6/2015 | Gotteland et al. | |
| 9,056,771 B2 | 6/2015 | Koseoglu et al. | |
| 9,487,400 B2 | 11/2016 | De Jong et al. | |
| 2003/0047716 A1* | 3/2003 | Tsang | C10J 3/54 252/373 |
| 2006/0112639 A1* | 6/2006 | Nick | C10K 1/005 48/198.1 |
| 2011/0289847 A1* | 12/2011 | Shaw | B01D 61/147 423/644 |
| 2013/0028834 A1 | 1/2013 | Koseoglu | |
| 2015/0240171 A1* | 8/2015 | Mani | C10J 3/845 252/373 |

(Continued)

FOREIGN PATENT DOCUMENTS

| | | |
|---|---|---|
| CN | 208121049 U | 11/2018 |
| EP | 0677567 A1 | 10/1995 |
| WO | 2015011114 A1 | 1/2015 |

(Continued)

*Primary Examiner* — Imran Akram
(74) *Attorney, Agent, or Firm* — Amy Carr Trexler

(57) ABSTRACT

A residue stream comprising liquid hydrocarbons and metal-rich solid particles is reacted with an oxidant stream in a gasifier to produce a syngas stream that is quenched in a water bath. The risk of plugging in the water lines is reduced by removing solids from the recycled water streams. Acid gases are stripped from at least a portion of the recycled water to reduce the risk of precipitates forming from the reaction of dissolved acid gases with metal ions.

13 Claims, 2 Drawing Sheets

(56) References Cited

U.S. PATENT DOCUMENTS

2020/0017783 A1* 1/2020 Santos Graca ........ B01D 47/10
2020/0247910 A1* 8/2020 Sheppard .................. C08B 3/06

FOREIGN PATENT DOCUMENTS

| WO | 2017102940 A1 | 6/2017 |
| WO | 2017102942 A1 | 6/2017 |
| WO | 2017102945 A1 | 6/2017 |

* cited by examiner

GASIFICATION OF HIGH-ASH FEEDSTOCK

BACKGROUND

The following disclosure is directed to a process to convert a liquid hydrocarbon feedstock comprising ash by partial oxidation to produce syngas. Ash is defined as non-combustible material such as metals, metal oxides, and metal sulfides.

Heavy hydrocarbon liquid residue streams are produced as a byproduct of oil refining, for example slurry hydrocracking technology or ebullated bed technology. These processes produce a liquid hydrocarbon waste stream which contains a high concentration of solids originating from metal catalyst precursors with solid carbon formed around the metal. Heavy hydrocarbon liquid residue streams containing ash may also be obtained from tar sands, also referred to as oil sands or bituminous sands. These low-value streams can be upgraded via gasification to produce higher-value hydrogen, fuel gas, and power for use onsite. The economic drivers are such that increasingly challenging streams are being identified for gasification, including streams with much higher weight percentages of metals, for example from spent catalyst. These solids do not react with oxygen and contribute to a high loading of ash in the gasifier.

Previous industrial experience in residue gasification has demonstrated that residue feedstock with ash content above 0.4 wt % cannot be processed using a syngas effluent cooler without damaging the equipment, resulting in an unacceptably short lifetime. A syngas effluent cooler (SEC) uses hot syngas to generate steam before entering a soot removal section. Soot is defined as solid particles comprising unburned carbon and metal ash. New feedstocks such as liquid residue streams may have over 1.0 wt % ash as well as higher concentrations of fouling components. The higher ash content of these new feedstocks also increases the total suspended solids load in the soot water handling systems.

The ash may comprise metal catalysts which tend to cause fouling and in extreme cases plugging of lines. Because the metal catalysts are a valuable product to be recycled, it is desired to operate the gasifier in a non-slagging regime to prevent the metals from forming a molten slag that would be uneconomic to separate. If the ash is coated with sufficient levels of carbon, the ash will not stick to itself and cause fouling problems. De Jong et al. (U.S. Pat. No. 9,487,400) teaches the use of a bottom quench gasifier for liquid hydrocarbons containing ash that produces enough carbon to coat the metal ash at temperatures below the ash fusion temperature so that the ash does not form a molten slag.

For SEC technology the preferred carbon-to-ash ratio ranges from 4 to 6, where the carbon-to-ash ratio is defined as the ratio of the weight of the carbon to the weight of the metal in the soot. Below this range the ash particles are insufficiently coated, leading to sticking to surfaces, cooling, and solidifying. Above this range the carbon coating on the ash particles is so thick that the particles may agglomerate and foul equipment, and even if the ash particles can exit the SEC the downstream solids removal system required is so large as to be impractical. A high carbon-to-ash ratio leads to an even larger downstream solids removal systems in the case of residue feedstocks with greater than 1.0 wt % ash.

Because ash is a mixture of species, the phase transition from solid ash to molten slag takes place over a range of temperatures. The lowest temperature at which the ash begins to melt is the initial deformation temperature, at which point the ash starts to become sticky. The ash melts further as the temperature increases through the softening temperature, the hemispherical temperature, and finally the fluid temperature at which point the ash is fully molten. The ash fusion temperature is a function of the ash composition, and therefore the feedstock composition. The ASTM 1857 method measures the phase transition temperatures for an ash sample as described in Akar et al. (Asian J. of Chemistry (2009) 21(3):2105-2109). The ash fusion temperature is defined herein as the fluid temperature.

One alternative to coating the ash with carbon is to operate above the ash fusion temperature in the slagging regime so that the ash forms slag, defined as an oxide-rich, predominantly liquid phase. In contrast, a dry ash is defined as predominantly solid-phase oxide-rich particles that travel through a non-slagging gasifier entrained in the syngas. Liu (WO 2017/102940) describes a gasifier for residue feedstock that operates at temperatures in the slagging regime. Koseoglu et al. (U.S. Pat. No. 9,056,771) teaches the use of a membrane wall gasifier to react heavy residue with spent solid heterogeneous catalyst in a configuration that uses an SEC instead of a water bath. The membrane wall uses a build-up of solidified mineral ash slag to protect the refractory from slag. Operation in the slagging regime has higher costs compared to dry ash, such as increased oxygen usage associated with higher operating temperatures, reduced refractory lifetime, and increased risk of plugging.

Metal recovery from slag is expensive and inefficient due to requiring additional processing steps of extracting the slag from the system, then recovering metals from the slag. Typically operating in the slagging regime also requires addition of flux to control the flow properties of the slag. Dry ash is preferred as it keeps the metal ash particles from combining and forming alloys, improving downstream metals recovery from unalloyed solid metal particles.

However, dry ash operation presents significant challenges for feedstocks with high ash content. The bottom quench process is water intensive, so recycling of process water streams is desired. Without recycle, hundreds if not thousands of tonnes of water per day would be needed for a typically-sized gasification process. The high loading of carbon-coated metal ash particles increases the risk of clogging in the recycle of process water. Gilmer (U.S. Pat. No. 4,705,542) teaches that in order to recycle water to the bottom quench process, solids must be removed.

Solids present an obvious risk of plugging, but the compounds present in the gasification of residue streams with high metal ash content present an additional risk of solids precipitated by downstream reactions. Salts and acid gases generated in the gasifier dissolve in the process water. Different process water streams can accumulate more salts or acid gases, depending on the unit operations they undergo. An acid gas-rich process water stream and a salt-rich process water stream separately present no risk to plugging, but when mixed prior to recycle to the bottom quench can precipitate out as a solid. There is a need in the industry to maximize internal recycle of process water streams while minimizing the risk of plugging.

SUMMARY

This disclosure relates to a process that can gasify a residue stream comprising liquid hydrocarbons and metal-rich solid particles, wherein the metal-rich solid particles comprise one or more metal components such as vanadium, nickel, iron, magnesium, aluminum, molybdenum, zinc, lead, tin, sodium, potassium, and calcium, non-metallic components such as phosphorus, silicon, and organic halides, and solid carbon formed in the refinery residue upgrading process. Catalyst particles may be present both in a liquid hydrocarbon matrix and/or as solid particles. As a result of the gasification process, some metallic components that have been a catalyst in the upstream process are coated by carbon, such as coke particles.

In order to reduce the risk of plugging in the water lines, solids are removed from recycled water, either by filtration or vaporization and condensation. Furthermore, acid gases are stripped from at least a portion of the recycled water in order to reduce the risk of precipitation by the reaction of acid gases such as carbon dioxide with metal ions such as calcium present in process water streams to produce solid calcium carbonate.

In at least some embodiments, the process allows operation of the gasifier at a lower carbon-to-ash ratio than SEC technology, which both reduces solids loading in the solids removal system and increases the conversion rate of hydrocarbons in the feedstock to syngas.

Aspect 1: A process for the gasification of a residue stream comprising liquid hydrocarbons and metal-rich solid particles, said process comprising reacting the residue stream with an oxidant stream in a gasifier to produce a hot syngas stream comprising carbon monoxide, hydrogen, and soot; contacting the hot syngas stream with a quench water stream to produce a quenched syngas stream and a water bath in the gasifier; removing a soot-containing quench water stream from the water bath; washing the quenched syngas stream with a scrubber water stream to produce a raw syngas stream and a soot water stream; separating the soot-containing quench water stream and at least a portion of the soot water stream to produce one or more overhead vapor streams and a concentrated soot water stream; filtering the concentrated soot water stream to produce a solid filter cake and a liquid filtrate stream; dividing at least a portion of the liquid filtrate stream to form a primary filtrate fraction; stripping a first sour gas stream from the primary filtrate fraction to produce a stripped water stream; wherein the quench water stream comprises at least one of at least a portion of the stripped water stream and at least a portion of the liquid filtrate stream.

Aspect 2: A process according to Aspect 1, further comprising the step of dividing at least a portion of the quench water stream to form the scrubber water stream.

Aspect 3: A process according to Aspect 1 or Aspect 2, wherein the step of washing the quenched syngas stream comprises separating the quenched syngas stream to produce the soot water stream and an intermediate syngas stream; washing the intermediate syngas stream with the scrubber water stream to produce a raw syngas stream and a recycled soot water stream; dividing at least a portion of the recycled soot water stream to form a first recycled soot water fraction; and washing the quenched syngas stream with the first recycled soot water fraction prior to separating into an intermediate syngas stream and a soot water stream.

Aspect 4: A process according to Aspect 3, further comprising the steps of dividing at least a portion of the recycled soot water stream to form a second recycled soot water fraction; and washing the intermediate syngas stream with the second recycled soot water fraction.

Aspect 5: A process according to any of Aspects 1 to 4, further comprising the steps of dividing at least a portion of the liquid filtrate stream to form a wash filtrate fraction; and washing the quenched syngas stream with the wash filtrate fraction prior to separating into an intermediate syngas stream and a soot water stream.

Aspect 6: A process according to any of Aspects 1 to 5, further comprising the steps of dividing at least a portion of the filtrate stream to form a heat exchange filtrate fraction; transferring heat to the heat exchange filtrate fraction from one or more of the following streams: the one or more overhead vapor streams and the concentrated soot water stream; and combining the heat exchange filtrate fraction with at least a portion of the stripped water stream.

Aspect 7: A process according to Aspect 6, further comprising partially condensing the one or more overhead vapor streams to produce one or more partially condensed overhead streams; and stripping a second sour gas stream from the one or more partially condensed overhead streams.

Aspect 8: A process according to any of Aspects 1 to 7, further comprising the steps of dividing at least a portion of the soot water stream to form a second soot water fraction and feeding the second soot water fraction to the water bath.

Aspect 9: A process according to any of Aspects 1 to 8, wherein the gasifier is operated in a non-slagging regime.

Aspect 10: A process according to any of Aspects 1 to 9, further comprising the step of combining a boiler feed water stream with at least a portion of the stripped water stream.

Aspect 11: A process according to any of Aspects 1 to 10, wherein the solid filter cake comprises solid metal particles that are unalloyed.

Aspect 12: A process according to any of Aspects 1 to 11, wherein the residence time of the residue stream in the gasifier is between 10 and 30 seconds.

Aspect 13: A process according to any of Aspects 1 to 12, wherein the soot comprises a carbon fraction and a metal fraction and the ratio of the weight of the carbon fraction divided by the weight of the metal fraction is between 1 and 2.

Aspect 14: A process for the gasification of a residue stream comprising liquid hydrocarbons and metal-rich solid particles, said process comprising reacting the residue stream with an oxidant stream in a gasifier to produce a hot syngas stream comprising carbon monoxide, hydrogen, and soot; contacting the hot syngas stream with a quench water stream to produce a quenched syngas stream and a soot-containing quench water stream; washing the quenched syngas stream with a scrubber water stream to produce a raw syngas stream and a soot water stream; wherein the quench water stream comprises at least a portion of one or more of the following: the soot-containing quench water stream, a stream derived from the soot-containing quench water stream, the soot water stream, and a stream derived from the soot water stream; and wherein the raw syngas comprises between 40% and 50% water by volume.

Aspect 15: A process according to Aspect 14, wherein the scrubber water stream comprises at least a portion of one or more of the following: the soot-containing quench water stream, a stream derived from the soot-containing quench water stream, the soot water stream, and a stream derived from the soot water stream.

Aspect 16: An apparatus for the gasification of a residue stream comprising liquid hydrocarbons and metal-rich solid particles, said apparatus comprising a gasifier configured to receive a residue stream and an oxidant stream and to produce a quenched syngas stream, the gasifier comprises a quench water inlet and a water bath in fluid communication with the quenched syngas stream; a soot removal system in fluid flow communication with the gasifier, the soot removal system configured to receive the quenched syngas stream from the gasifier and a scrubber water stream to produce a soot water stream and a raw syngas stream; a flash system comprising one or more liquid-vapor separators, in fluid flow communication with the water bath and the soot removal system, the flash system configured to receive a soot-containing quench water stream from the water bath and at least a portion of the soot water stream from the soot removal system to produce one or more partially condensed overhead streams and a concentrated soot stream; a waste water stripping system in fluid flow communication with the flash system configured to receive the one or more partially condensed overhead streams and produce a sour gas stream and a stripped water stream; and a filtration unit, configured to receive the concentrated soot stream and produce a solid filter cake and a liquid filtrate stream; wherein the water bath is configured to receive at least a portion of the stripped water stream from the waste water stripping system and/or at least a portion of the liquid filtrate stream.

Aspect 17: An apparatus according to Aspect 16, further comprising a metals recovery system configured to receive the solid filter cake from the filter and produce a metals-enriched fraction and a metals-depleted fraction.

Aspect 18: An apparatus according to Aspect 16 or Aspect 17, wherein the soot removal system comprises a soot separator in fluid flow communication with the gasifier and a soot scrubber in fluid flow communication with the soot separator; wherein the soot separator is configured to receive the quenched syngas stream to produce the soot water stream and an intermediate syngas stream; and wherein the soot scrubber is configured to receive the intermediate syngas stream and the scrubber water stream to produce the raw syngas stream.

Aspect 19: As apparatus according to any of Aspects 16 to 18, wherein the soot removal system further comprises a quench pipe in fluid flow communication with the gasifier and the soot separator; and wherein the quench pipe is configured to receive the quenched syngas stream and at least a portion of the liquid filtrate stream.

BRIEF DESCRIPTION OF THE DRAWINGS

The present disclosure will hereinafter be described in conjunction with the appended figures wherein like numerals denote like elements.

DETAILED DESCRIPTION

Figure 1:
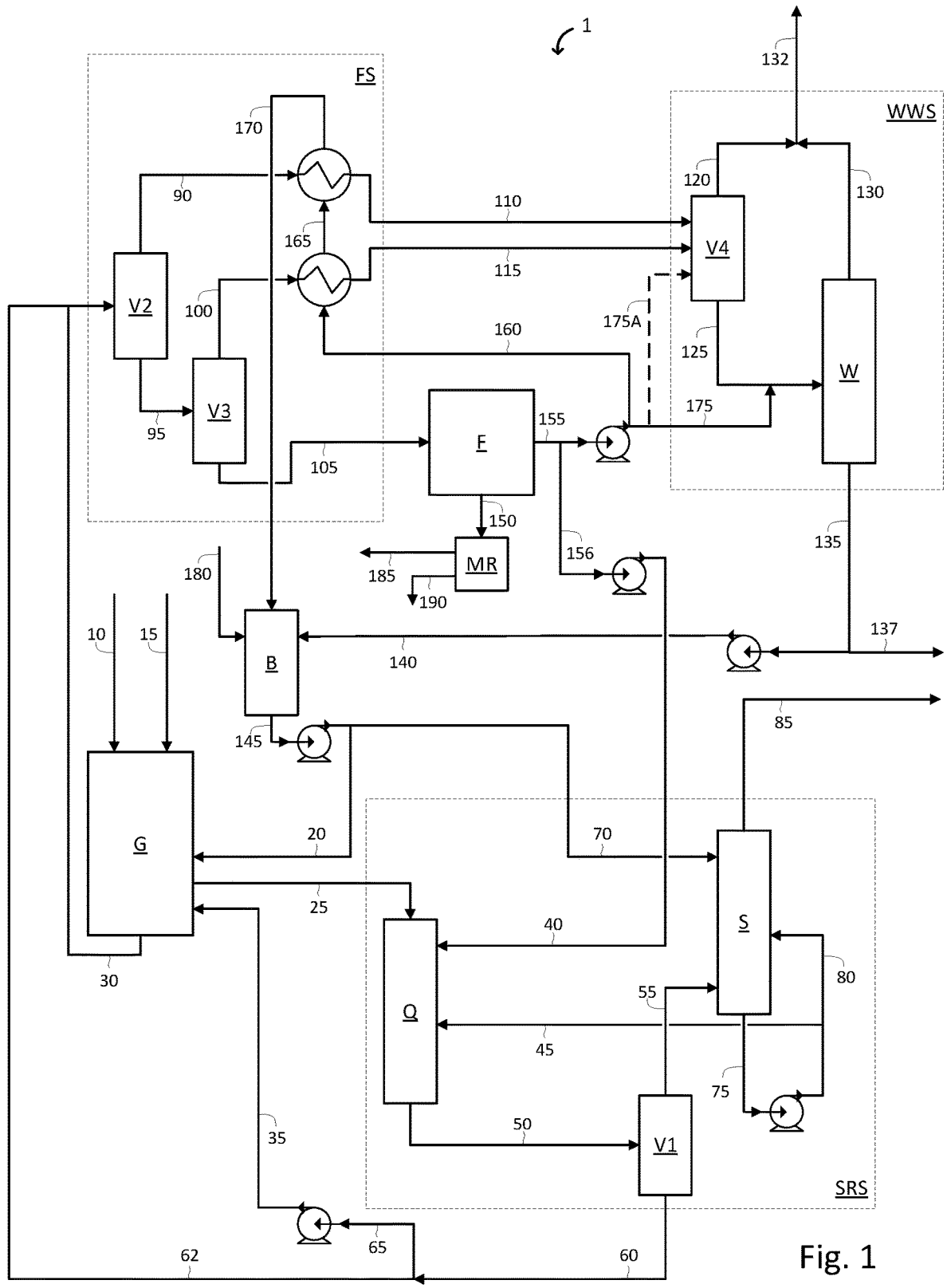
FIG. 1 is a diagram depicting an embodiment of a gasification process in which acid gases and solids are removed from soot water to allow recycle to the gasifier.

The ensuing detailed description provides exemplary embodiments only, and is not intended to limit the scope, applicability, or configuration of the invention. Rather, the ensuing detailed description will provide those skilled in the art with an enabling description for implementing the exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The adjective "any" means one, some, or all, indiscriminately of quantity.

The phrase "at least a portion" means "a portion or all." The "at least a portion of a stream" has the same composition, with the same concentration of each of the species, as the stream from which it is derived.

As used herein, "first," "second," "third," etc. are used to distinguish among a plurality of steps and/or features, and is not indicative of the total number, or relative position in time and/or space, unless expressly stated as such.

All composition values will be specified in mole percent for gas phase and weight percent for solid and liquid phase.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

The term "indirect heat exchange" refers to the process of transferring sensible heat and/or latent heat between two or more fluids without the fluids in question coming into physical contact with one another. The heat may be transferred through the wall of a heat exchanger or with the use of an intermediate heat transfer fluid. The term "hot stream" refers to any stream that exits the heat exchanger at a lower temperature than it entered. Conversely, a "cold stream" is one that exits the heat exchanger at a higher temperature than it entered.

FIG. 1 shows an embodiment of a system 1 for the reaction of a residue stream 10, which comprises liquid hydrocarbons and metal ash, with an oxidant stream 15 in gasifier G. A feed oil buffer vessel (not shown) may optionally be used to smooth out any surges in the lines and to cater to spikes in demand. The feed oil buffer vessel may be heated by a heating coil to maintain the temperature of the feed in case of a gasifier start and stop. A spared feed oil filter (not shown) may be installed in a lower pressure distribution system to remove larger particles before the burners. The oxidant stream 15 may be a gas stream comprising pure oxygen, oxygen enriched air, or air. The oxidant stream 15 may also comprise steam to act as a moderator, which reduces the severity of the strongly exothermic oxidation reaction.

One of the main components of the gasifier G is the burner. One or more lifted flame burners may be located in the top of each gasifier, firing downward (not shown). Each lifted flame burner comprises a co-annular burner with an additional moderator lifting channel. The assembled burner has an exit opening comprising co-annular channels and is surrounded by a water-cooled burner barrel. The burner must be cooled to prevent overheating and damage due to the severe gasification conditions. The burner barrel is cooled with high pressure cooling water from the burner cooling water system. The cooling water may be maintained at a pressure higher than the operating pressure in the gasifier G to prevent syngas from leaking into the burner cooling water system in the event of a failed burner barrel and to prevent undesired blow-out of syngas to the atmosphere. The temperature of the cooling water is typically kept above dew point of the raw syngas to prevent dew point corrosion of the burner barrel.

The gasification process is typically a non-catalytic and auto-thermal process where the feedstock is partially oxidised with oxygen and steam to produce hot syngas (comprising mainly CO and H2). The pressure is typically 10-100 barg and the residence time typically ranges from 10 to 30 s. In one embodiment, the process temperature (reactor mid-temperature) is kept below the ash fusion temperature, which is sufficient to meet the desired feedstock conversion rate. The ash fusion temperature is a complex function of the composition of the ash, but for most residue feedstocks operation above 1500° C. is in the slagging regime. A small amount of soot, comprising unconverted carbon and metal ash, is produced in the gasifier G. The gasifier G operates in the non-slagging regime in which the metal ash is in the form of a dry ash as opposed to a liquid slag.

The gasifier G may comprise a top refractory lined reactor section where the high temperature partial oxidation reaction takes place and a lower bottom quench section containing a water bath where syngas cooling and the first step of bulk soot removal takes place. Part of the soot is washed from the hot syngas in this bottom quench and is removed in a soot-containing quench water stream 30 by means of a liquid outlet at the bottom of the water bath.

Hot syngas leaving the bottom of the top reactor section is directed downwards through the bottom quench section where it is cooled by passage through a water bath.

The water bath is fed by a quench water stream 20 which may comprise any of the following: preheated recycled filtrate, recycled water from the waste water stripping system (WWS), process condensate from sources such as sulfur recovery units, acid gas removal units, or knock-out separators from downstream sour shift units, boiler feed water, and make-up water. If the oxidant stream 15 is preheated using steam, then the resulting condensate can also be fed to the water bath.

Quenched syngas stream 25 exits the bottom quench section and enters a soot removal system SRS. In FIG. 1 this is shown as a two-stage water wash. In the first stage, the syngas enters a quench pipe Q, where the syngas is further washed and cooled by a series of water sprays. Water may be supplied from two separate sources: a wash filtrate fraction 40 from a filtration unit F, and a first recycled soot water fraction 45 from the soot scrubber S. A second quenched syngas stream 50 leaves the quench pipe Q and enters a soot separator V1, wherein second quenched syngas stream 50 is separated into soot water stream 60 and intermediate syngas stream 55. Soot water stream 60, comprises the solid particles from second quenched syngas stream 50. At least a portion of the soot water stream 60 is directed to a flash system FS as first soot water fraction 62. At least a portion of soot water stream 60 may be partially recycled back to the gasifier water bath via a recycle pump as second soot water fraction 65. The second soot water fraction may be fed to the gasifier water bath in such a manner as to promote turbulence and prevent solids from settling within the bath which would result in fouling and/or blockage of the equipment.

Capturing and cooling the ash in the gasifier water bath eliminates the tortuous cooling pathways of the SEC technology, reducing the carbon-to-ash ratio needed to prevent fouling. The carbon-to-ash ratio required to prevent fouling is between 1 and 2 compared to values between 4 and 6 in SEC technology.

The intermediate syngas stream 55 is routed to a soot scrubber S, where the remaining solids are removed to meet the syngas solids specification, producing a raw syngas stream 85, which is directed to the battery limit of system 1. A scrubber water stream 70 is typically fed to soot scrubber S counter-currently with the intermediate syngas stream 55. Recycled soot water stream 75 exits the bottom of the soot scrubber S and is pumped. At least a portion of the recycled soot water stream 75 may be fed to the quench pipe Q as first recycled soot water fraction 45. At least a portion of the recycled soot water stream 75 may be fed to the soot scrubber S as second recycled soot water fraction 80 to remove fine particles.

When the required degree of solids removal is lower, then the quench pipe Q depicted in FIG. 1 may be eliminated and the quenched syngas stream 25 may directly feed the soot separator V1.

The soot-containing quench water stream 30 leaving the water bath in the gasifier G and the first soot water fraction 62 are fed to a flash system FS. The flash system FS may comprise any number and type of liquid-vapor separators, including flash vessels or columns. In FIG. 1 the flash system FS comprises two flash vessels, high pressure flash vessel V2 and low pressure flash vessel V3. The soot-containing quench water stream 30 leaving the water bath in the gasifier G and the first soot water fraction 62 are combined and fed to high pressure flash vessel V2 and separated into a first overhead stream 90 and a first liquid stream 95. The first liquid stream 95 is reduced in pressure and sent to low pressure flash vessel V3 where it is separated into a second overhead stream 100 and a concentrated soot water stream 105. The concentrated soot water stream 105 is then sent to a filtration unit F where solids are removed, for example as a solid filter cake 150, leaving a liquid filtrate stream 155. The liquid filtrate stream 155 may then be divided into a primary filtrate fraction 175 that can be sent to the waste water stripping system WWS, a wash filtrate fraction 156 which may optionally be pumped before feeding the quench pipe Q, and a heat exchange filtrate fraction 160 that may be preheated and recycled to a water buffer vessel B. Use of the water buffer vessel B may allow for increased reaction time in case of upsets. Make-up water 180 may optionally be added to water buffer vessel B, and in at least some embodiments may be controlled to balance any water fluctuations in the system, especially in the case of a plant upset. Make-up water 180 may comprise boiler feed water. Improved recycling of water to the water buffer vessel B reduces the amount of make-up water 180 needed.

Heat integration is a key element of at least some embodiments of the present disclosure because downstream processing of the syngas is optimized when the temperature of the raw syngas stream 85 is maximized. One potential downstream application requiring high temperature raw syngas is sour shift units as this allows higher water content in the raw syngas, which in turn reduces steam demand in the sour shift unit. The water content by volume of the raw syngas stream 85 in the present disclosure typically ranges from about 40% to 50%, compared with 0% to 5% in the prior art SEC technology. Heat integration maximizes the temperature and water content of the raw syngas product. When the downstream use of the raw syngas product is hydrogen production, both of these characteristics improve the efficiency of the reforming process, for example, by reducing the addition of superheated steam in downstream water gas shift reactions. The temperature of the raw syngas stream 85 may be increased by preheating the water streams that are used to quench the gasifier G and/or scrub the syngas in the soot removal system SRS. In the present disclosure, the first overhead stream 90 and second overhead stream 100 contain a great deal of heat that may be recovered by indirect heat exchange with the heat exchange filtrate fraction 160. The first overhead stream 90 and the second overhead stream 100 may be partially condensed to produce first partially condensed overhead stream 110 and second partially condensed overhead stream 115.

In at least some embodiments, sour gases must be removed from process water streams to prevent the reaction of gases like carbon dioxide and hydrogen sulfide with metal ions like calcium and nickel to form solid precipitates like calcium carbonate or nickel sulfide, which would plug the system. First partially condensed overhead stream 110 and second partially condensed overhead stream 115 are fed to the waste water stripping system WWS. The waste water stripping system WWS may comprise any number of flash vessels and/or columns that function to produce a concentrated sour gas stream 132. In the example embodiment shown in FIG. 1, the waste water stripping system WWS comprises a flash gas separator V4 that receives the first partially condensed overhead stream 110 and the second partially condensed overhead stream 115, and a waste water stripper column W that receives the waste water stream 125 from the bottoms of the flash gas separator V4. The waste water stripper column W may be stripped with steam or any other suitable gas, for example in a counter-current arrangement. The stripped water stream 135 may then be recycled to the water buffer vessel B. At least a portion of the stripped water stream 135 may be divided as purge water stream 137 and sent to the battery limit for further treatment to limit the build-up of trace components in the water loop. The heat introduced to the waste water stripper column W to remove sour gases may additionally preheat the stripped water stream 135. In at least some embodiments, preheating the stripped water stream 135 may be beneficial to maximize the temperature of the raw syngas stream 85. The primary filtrate fraction 175 may be fed to the waste water stripping system WWS at any location configured to accept a liquid stream. Two alternative embodiments are shown in FIG. 1, one in which primary filtrate fraction 175 is combined with the waste water stream 125 and one in which primary filtrate fraction 175A is directly fed to flash gas separator V4. Sour gas stream 120 leaving flash gas separator V4 and sour gas stream 130 leaving the waste water stripper column W may be disposed of separately or combined to form concentrated sour gas stream 132.

The concentrated soot water stream 105 contains carbon and ash solids which are removed in the filtration unit F. The filtration unit F may comprise any number of stages of solids removal, for example membrane filter presses. The filtrate from the filtration steps may be collected in a filtrate tank within the filtration unit F in FIG. 1. The solid filter cake 150 produced may then be transported to a metals recovery system MR where a metals-enriched fraction 185, comprising for example, but not limited to, molybdenum, vanadium, and/or nickel, are separated from a metals-depleted fraction 190. Recovery of a metals-enriched fraction is easier when the gasifier G operates in a non-slagging regime compared to a gasifier in a slagging regime in which the metals would be trapped in a glassy oxide-rich phase. The metals recovery system MR may utilize any technique known in the art that is suitable for recovery of the metals of interest, for example a multiple hearth furnace, in which carbon is burned off of the solid filter cake 150. In the case where the metals recovery system MR is a multiple hearth furnace, the metals-enriched fraction 185 may be a metal-rich ash and the metals-depleted fraction 190 may be a flue gas.

Figure 2:
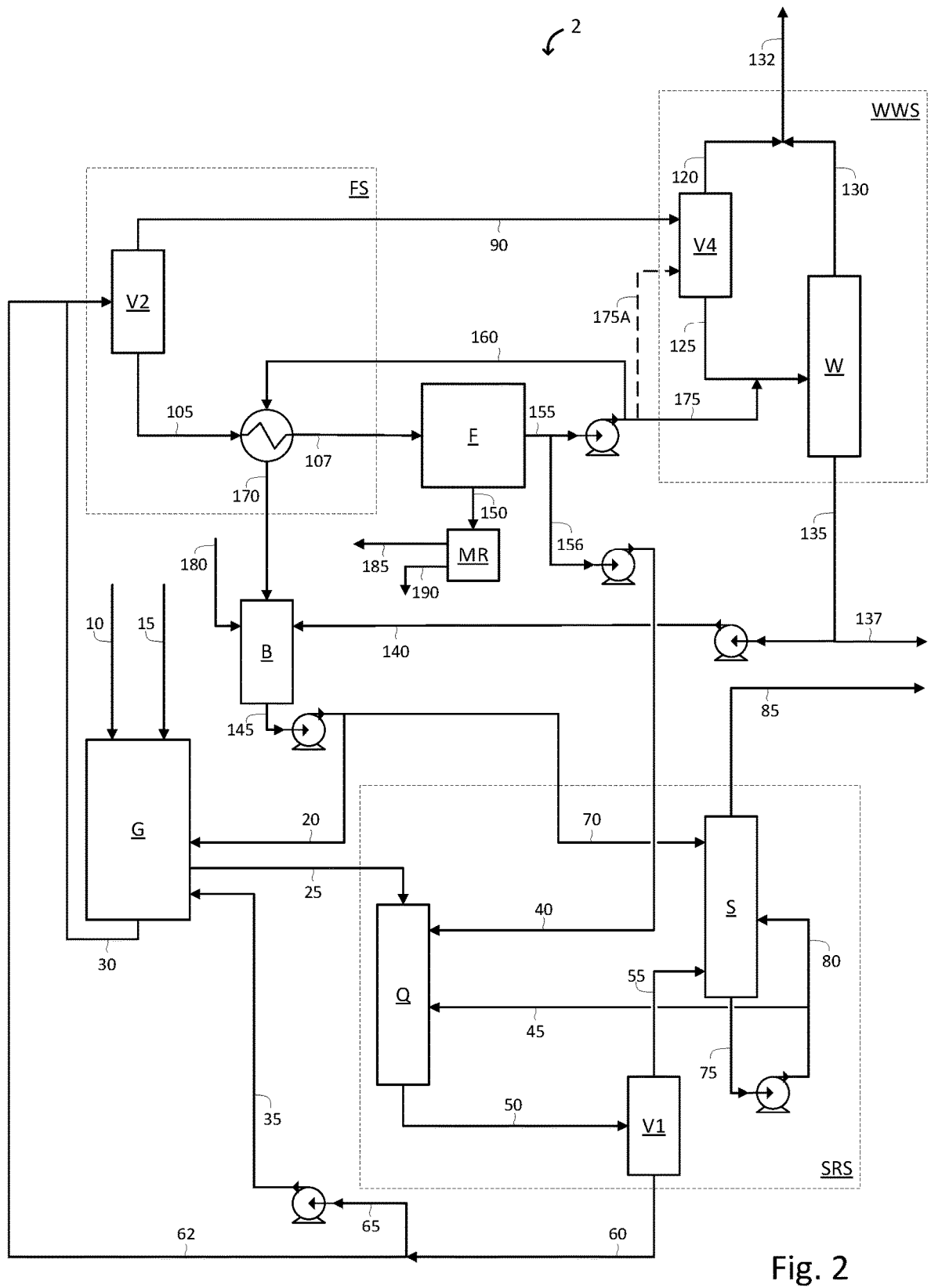
FIG. 2 is a diagram depicting an embodiment of a gasification process with a flash system comprising a single flash vessel.

FIG. 2 illustrates an embodiment of a gasification system 2 in which the flash system FS comprises a single high pressure flash vessel V2. The first overhead stream 90 is sent directly to the waste water stripping system. The concentrated soot water stream 105 leaving the bottoms of the high pressure flash vessel V2 preheats the heat exchange filtrate fraction 160 by indirect heat exchange. The cooled concentrated soot water stream 107 is sent to the filtration unit F, similar to concentrated soot water stream 105 in FIG. 1.

While the principles of the invention have been described above in connection with preferred embodiments, it is to be clearly understood that this description is made only by way of example and not as a limitation of the scope of the invention.

The invention claimed is:

1. A process for the gasification of a residue stream comprising liquid hydrocarbons and metal-rich solid particles, said process comprising:
reacting the residue stream with an oxidant stream in a gasifier to produce a hot syngas stream comprising carbon monoxide, hydrogen, and soot;
contacting the hot syngas stream with a quench water stream to produce a quenched syngas stream and a soot-containing quench water stream;
washing the quenched syngas stream with a scrubber water stream to produce a raw syngas stream and a soot water stream;
separating the soot-containing quench water stream and at least a portion of the soot water stream to produce one or more overhead vapor streams and a concentrated soot water stream;
filtering the concentrated soot water stream to produce a solid filter cake and a liquid filtrate stream;
dividing at least a portion of the liquid filtrate stream to form a heat exchange filtrate fraction;
transferring heat to the heat exchange filtrate fraction from one or more of the following streams: the one or more overhead vapor streams and the concentrated soot water stream; and
combining the heat exchange filtrate fraction with at least a portion of the stripped water stream,
wherein the quench water stream comprises at least a portion of one or more of the following: the soot-containing quench water stream, a stream derived from the soot-containing quench water stream, the soot water stream, and a stream derived from the soot water stream, and
wherein the raw syngas comprises between 40% and 50% water by volume.

2. The process of claim 1, further comprising the step of dividing at least a portion of the quench water stream to form the scrubber water stream.

3. The process of claim 1, wherein the step of washing the quenched syngas stream comprises the following:
separating the quenched syngas stream to produce the soot water stream and an intermediate syngas stream;

washing the intermediate syngas stream with the scrubber water stream to produce a raw syngas stream and a recycled soot water stream;

dividing at least a portion of the recycled soot water stream to form a first recycled soot water fraction; and washing the quenched syngas stream with the first recycled soot water fraction prior to separating into an intermediate syngas stream and a soot water stream.

4. The process of claim 3, further comprising the steps of dividing at least a portion of the recycled soot water stream to form a second recycled soot water fraction; and washing the intermediate syngas stream with the second recycled soot water fraction.

5. The process of claim 1, further comprising the steps of dividing at least a portion of the liquid filtrate stream to form a wash filtrate fraction; and washing the quenched syngas stream with the wash filtrate fraction prior to separating into an intermediate syngas stream and a soot water stream.

6. The process of claim 1, further comprising partially condensing the one or more overhead vapor streams to produce one or more partially condensed overhead streams; and stripping a second sour gas stream from the one or more partially condensed overhead streams.

7. The process of claim 1, further comprising the steps of dividing at least a portion of the soot water stream to form a second soot water fraction and feeding the second soot water fraction to the water bath.

8. The process of claim 1, wherein the gasifier is operated in a non-slagging regime.

9. The process of claim 1, further comprising the step of combining a boiler feed water stream with at least a portion of the stripped water stream.

10. The process of claim 1, wherein the solid filter cake comprises solid metal particles that are unalloyed.

11. The process of claim 1, wherein the residence time of the residue stream in the gasifier is between 10 and 30 seconds.

12. The process of claim 1, wherein the soot comprises a carbon fraction and a metal fraction and the ratio of the weight of the carbon fraction divided by the weight of the metal fraction is between 1 and 2.

13. The process of claim 1, wherein the scrubber water stream comprises at least a portion of one or more of the following: the soot-containing quench water stream, a stream derived from the soot-containing quench water stream, the soot water stream, and a stream derived from the soot water stream.

* * * * *